United States Patent Office 3,010,147
Patented Nov. 28, 1961

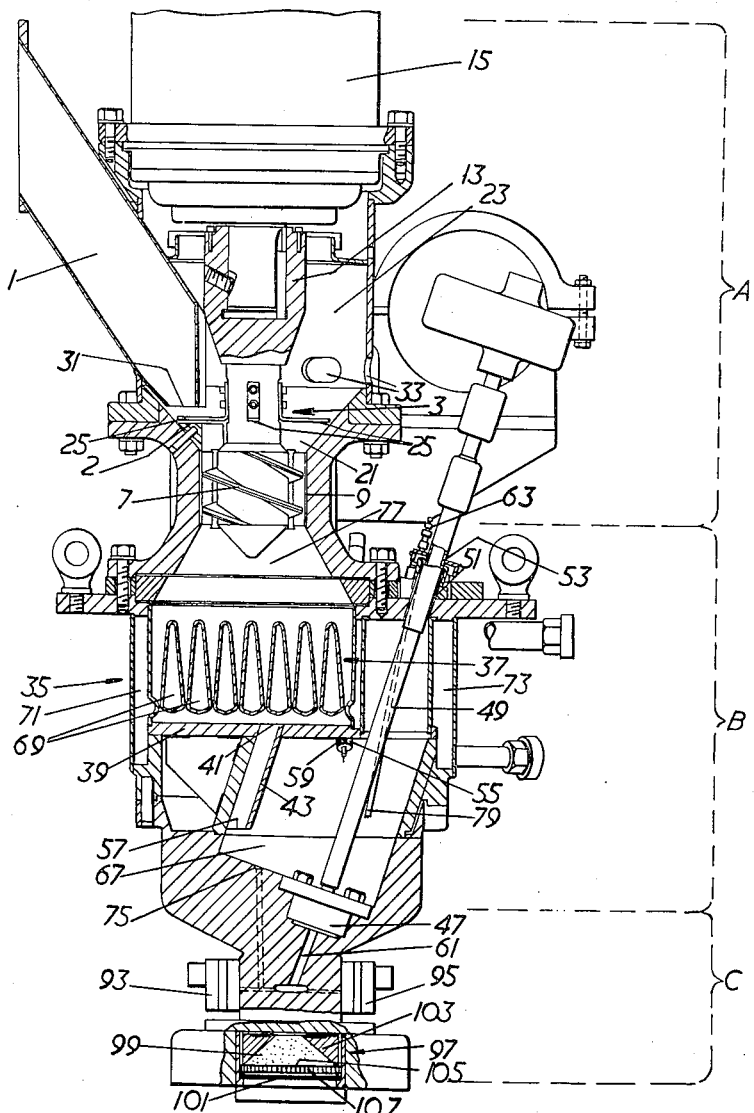

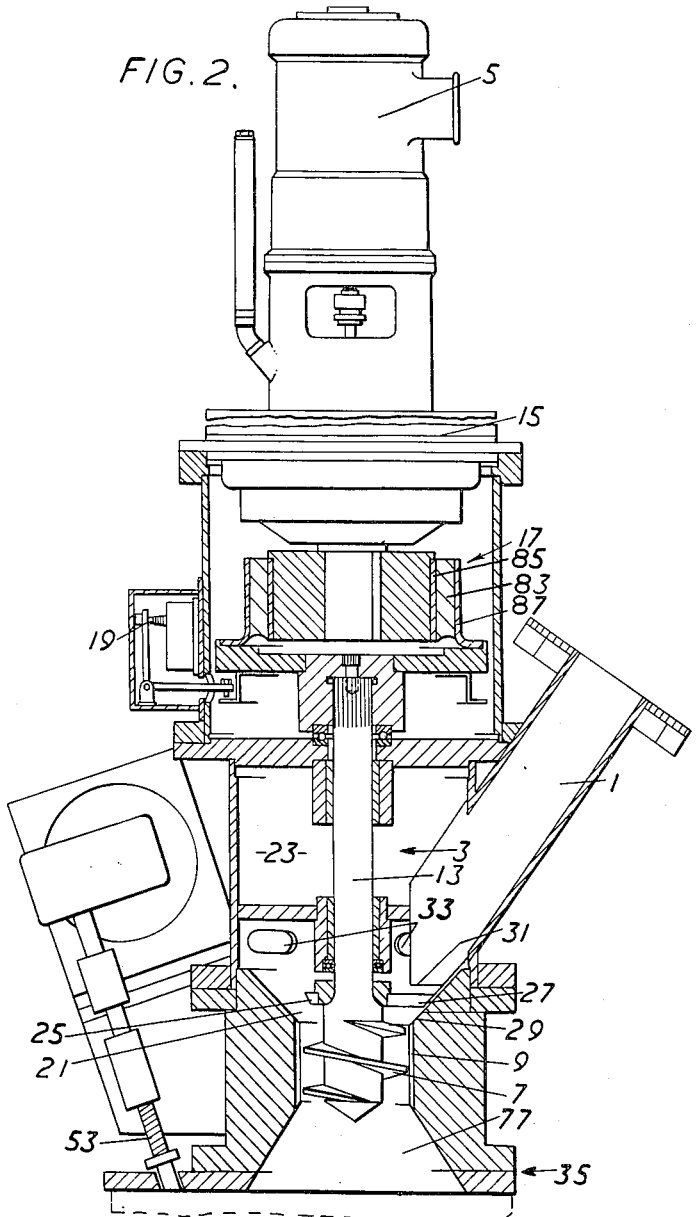

3,010,147
APPARATUS AND PROCESS FOR MELT SPINNING
Gerald T. Davies, Raglan, and Jeffrey O'Neill Fisher, Dewi Madoc Jones, Geoffrey K. Lewis, and Eric Wilson, Croesyceiliog Cwmbran, and Thomas R. Griffin, Balby, Doncaster, and Eric J. R. Hewitt, Long Meadow, Stevenage, England, assignors to British Nylon Spinners Limited, Pontypool, England
Filed Jan. 31, 1958, Ser. No. 712,499
Claims priority, application Great Britain Feb. 8, 1957
22 Claims. (Cl. 18—8)

The present invention concerns improvements in or relating to melt-spinning, and is particularly concerned with a process and apparatus for melt-spinning filaments, films, and the like from synthetic linear polymers such as nylon.

The art of melt-spinning (i.e. the melting of solid filament-forming material followed by extrusion thereof in the molten state) as developed over the past twenty years, has enabled the production of strong filaments and films of very uniform character from those fiber-forming substances which decompose only at temperatures well above their melting-points. Thus, melt-spinning has been a widely-used method by which filaments have been spun from the synthetic linear polyamides and the synthetic linear polyesters.

Of recent years, there has arisen a demand for very strong filaments, such as the heavy denier yarns of nylon, for use as tire cords in the manufacture of motor tires. Tire cord is usually composed of plied multifilament yarns having a total denier of about 840, and the stronger these yarns can be made the longer the life and the safer will be the tires made with them. Thus a tenacity of at least 9 grams per denier may be desired in nylon filaments for tire cord. For such a high tenacity, it is convenient to use, as raw material for the filaments, a polymer having a higher relative viscosity than that normally required in the polymer from which textile filaments are spun. Thus, whereas the normal relative viscosity of nylon polymer is from 33 to 36, that required for the high tenacity tire cord is preferably of the order of 43. The relative viscosity of a polyamide is the ratio of the viscosity of a solution thereof in ninety percent by weight formic acid containing 11 grams of polyamide per 100 cc. of solution at 25° C. to the viscosity of 90 percent formic acid at the same temperature. It is with the difficulties inherent in the melt-spinning of such relatively high viscosity polymers that this invention is chiefly concerned, although the invention is useful for the melt-spinning of polymers of any relative viscosity suitable for the production of strong fibers, where high throughputs are required, as when spinning for tire cord or for tow.

The main difficulty inherent in melt-spinning high viscosity polymers in apparatus such as that normally used and such as is described, for instance, in the specifications of British Letters Patent Nos. 533,307 and 653,757 is that melting may not occur at a sufficient rate for a truly productive process. This is due to the slowness with which the molten polymer comes away from the surfaces of the melting grid, due to its viscous nature, when the only force acting upon it is that of gravity. A further difficulty arises from the propensity of a high viscosity molten polyamide to form gel more quickly than one of normal viscosity if allowed to stand in the molten condition, and this propensity may be responsible for a further decrease in the rate of melting when a layer of gelled polymer forms on and adheres to the surfaces of the melting grid, as may well occur when there is no force other than gravity assisting in removing the molten polymer from the grid surfaces. Both these difficulties may be overcome to a large extent by the use of pressure melting apparatus which is known per se, but which itself is the cause of further difficulties when used to melt-spin high viscosity nylon polymer. In such known pressure-melting apparatus, means are employed to force the solid particles of polymer on to the melting-grid at a rate slightly in excess of the spinning rate, and it follows that an excess pressure will be built up above the melting-grid when molten polymer is unable to get away fast enough from the grid surfaces. Means are therefore provided to allow the pressure-feeding means, which may be a screw within a cylindrical barrel, to retract from the grid once a certain pressure has built up and this movement may be employed to actuate further means for stopping the feed of solid polymer until the pressure has dropped after the extrusion of a sufficient amount of the molten polymer. The apparatus is, therefore, self-balancing and relies on the pressure of the molten polymer above the melting grid to control the balance. With nylon polymer, at least, it is this very pressure, resulting in the dissolution of water deriving from the moisture contained in the solid polymer, which creates the difficulty alluded to above, in that the variable pressure on the molten nylon having water dissolved therein leads to a varying amount of hydrolysis of the polymer to the extent that the relative viscosity of the polymer will vary and may drop from 40 to 20 at times. This quite clearly is a state of affairs which renders the whole process nugatory. Certainly for nylon polymer, therefore, it is necessary to maintain the molten polymer at a constant pressure, preferably at or about atmospheric pressure, and this is preferably achieved, as described in the specification of British Letters Patent No. 653,757, by arranging that the polymer when melted is collected in a reservoir, or pool, below the melting grid, the pool having a sufficient volume to allow for a reasonable balance to be readily maintained between the rate of melting and the rate of spinning, such pool of molten polymer being maintained under an atmosphere of steam at atmospheric pressure, the presence of the steam additionally serving to exclude air from above the molten polymer and to remove the gaseous products of the slow decomposition of the molten polymer. In contradistinction to the apparatus described in the above-mentioned specification, however, it is not possible, when using means to supply the solid nylon polymer under pressure to the melting grid, to make use of the grid itself as the controlling means between the rate of melting and the rate of spinning owing to the undesirable hydrolysis referred to above. We have therefore found it necessary to provide means that will maintain the level of the pool of molten polymer substantially constant, such means comprising a level sensing apparatus which is capable of controlling the pressure-feed means. Thus, as hereinafter described in more detail, a desired arrangement for melt-spinning nylon polymer, provided in accordance with the present invention, particularly high viscosity nylon polymer, comprises a pressure feed means, a melting grid, a receptacle for the accommodation of a pool of molten polymer below the grid, means for removing molten polymer from the pool and means for extruding it, and level sensing means to maintain the level of molten polymer in the pool substantially constant at a given distance below the grid by control of the pressure feed means, the space above the surface of the molten polymer being maintained under an atmosphere of water vapour at substantially atmospheric pressure. With such an arrangement, the rate of melting may be increased to some 40 pounds per hour from the 5 pounds per hour or so which it is possible to attain with gravity melting apparatus of the same melting area. The pressure exerted on the polymer by the feed means may be of the order of 50 pounds per square inch, compared with a pressure of under 1 pound per square inch in known gravity melting apparatus.

The amount of molten polymer that is to be accommodated in the receptacle will depend on the shape thereof and on the rate of spinning, but must always be such that it will allow a relatively coarse control of the rate of feeding as it is obviously not desirable that there should ever be any risk of the amount of polymer available for spinning being below that required for the total denier required to be spun. In practice it has been found that a pool which allows of 7 minutes supply when spinning nylon polymer of relative viscosity 43 at a speed of 19 pounds per hour is suitable both from the point of view of the balance between rate of spinning and rate of melting, and from the point of view of the prevention of thermal degradation of the molten polymer, which may occur if the polymer is allowed to remain in the molten condition for too great a time.

The arrangement provided in accordance with the invention successfully overcomes the difficulties inherent in the known arrangements that are dependent on gravity. However, it is particularly desirable with high viscosity polymer to ensure that the polymer, as soon as it has been melted, is positively directed into the pool rather than allowed to drip from the grid into the pool. When dripping of molten polymer has been going on from one place for any length of time, gel is likely to be formed at this spot and gradually a stalactite will take shape. Such stalactitites have a tendency to break off after they have reached a certain size. In a melt-spinning apparatus they drop into the pool of molten polymer and subsequently may foul the extrusion pump or pumps, being particularly likely to bring about shearing of the pin in the driving shaft of the so-called booster pump. In the known gravity melting apparatus, the surface of the pool is normally at or above the level of the lower side of the melting grid, so that no dripping from the grid into the pool takes place. But where, as in the present invention, the level of the surface of the pool is normally required to be below that of the bottom of the grid, dripping of polymer from the grid will occur unless steps are taken to lead the molten polymer directly away from the grid and positively direct its flow from the grid into the pool. Such means may be integral with the melting grid itself; that is to say, that the grid may for instance comprise melting surfaces and a base portion adapted to direct molten polymer into one or more channels leading directly into the pool, such that the surface of the pool is always, during operation, maintained at or above the level of the delivery end of the channel or channels. Alternatively, the means may comprise a baffle plate, which may or may not itself be heated internally, fitted close beneath the under side of the fins or coils of the melting grid and extending across the melting chamber, and provided with a drain or drains for directing polymer down a channel or channels into the pool in a similar way to that described above. In this manner, polymer is collected directly after being melted and is caused to flow in a continuous stream rather than drip into the pool.

The present invention comprises, therefore, a process for melt-spinning fibre- or film-forming material, wherein said material in solid particulate form is forced under pressure to a heated melting means, the material is melted and the molten material is caused to flow in a continuous stream or streams downwardly into a pool of said molten material, above the surface of which is maintained an atmosphere substantially free of oxygen and substantially at a constant pressure at or about atmospheric pressure, the level of the surface of the said pool automatically being maintained substantially constant, and molten material is withdrawn from the said pool and spun into filaments, films or other shaped structures.

The invention also comprises apparatus for melting and spinning fibre- or film-forming material comprising means for forcing such material in solid particulate form under pressure to a melting means within a melting chamber, means for collecting molten material directly from said melting means and causing it to flow in a continuous stream or streams downwardly into a pool of said molten material maintained within that part of the chamber below said melting means, means for sensing the level of the surface of said pool and for automatically maintaining the level substantially constant by a control of the feed means, means for introducing a gas for excluding free oxygen from that part of the chamber between the said melting means and the surface of the said pool, and for keeping the pool at a constant pressure at or about atmospheric pressure, and means for withdrawing molten material from the said pool and for extruding it through a shaped orifice or orifices.

Convenient apparatus according to the invention will now be described with reference to the accompanying drawings and in connection with the melt-spinning of filaments from nylon polymer of high viscosity. In the drawings, FIGURE 1 is a general view of one convenient apparatus above referred to;

FIGURE 2 is a side view, partly in section of the screw feeding means of another said apparatus.

The apparatus as shown in FIGURE 1 comprises, essentially, three interconnected sections, namely a feed section A, a melting section B, and an extrusion section C. The three sections will be described separately.

The feed section A as shown in FIGURE 1 comprises a supply chute 1 for solid polymer in chip or flake form, the said chute having an outlet 31 within the lower part 21 of a chamber 23. This lower part 21 is frusto-conical in shape and narrows to the cylindrical bore 9 of a screw conveyor 3 comprising a double-start 2-flight screw 7, which is rotated by an electric motor (not shown) through gearing 15 and shaft 13. Immediately beneath the outlet of chute 1, a shelf 2 is secured to the conical side of the lower part 21 of the chamber 23, and is spaced sufficiently from the said outlet to prevent chips or flakes of polymer from falling further into the chamber but to allow them to be moved firstly in a horizontal direction by radial spreaders 25 affixed to and rotating with the shaft 13. There are, in fact, four such spreaders spaced at 90° from each other, and their function is to ensure controlled feeding of polymer chips or flakes to the first flight of the screw, at a rate such that the screw is always ready to accommodate the fresh chips or flakes and such that no congestion of chips or flakes can occur above the screw, which might otherwise occur and lead to "bridging" of the chips or flakes and consequent starvation of the screw. Ports 33 are cut in the walls of chamber 23 above the frusto-conical lower part 21, and steam and other gases can escape easily to atmosphere therethrough. The outlet 31 has a cross-section that is small compared with that of the chamber 21, and is such that the rate of descent of the polymer chips or flakes down the chute 1 is greater than the rate of ascent of the gases given off by the melting chip or flakes within the melting chamber 35. Consequently, there is no tendency for the steam or other gases to pass up the chute 1 rather than through the ports 33, and there will therefore by no tendency for the chips and flakes in the chute to coalesce leading to "bridging." An overload relay is fitted within the electrical supply circuit of the motor which is set to operate at a value of current corresponding to a state of affairs when the pressure in the upper part 77 of the melting chamber 35 has risen to a maximum permissible, safe amount say of the order of 70 pounds per square inch. An undue rise in pressure may occur, for instance, when, for some reason such as a drop in the temperature of the melting surfaces the melting of the polymer chips or flakes does not take place fast enough compared with the controlled rate of feeding. The screw 7 delivers the chips or flakes to the upper part 77 of melting chamber 35, the walls of which part diverge so that the eventual width of the chamber above the heated melting grid 37 is about double that of the barrel 9, as will be described in greater detail below in that part of the description relating to the melting section B.

An alternative form of feed section A is shown in greater detail in FIGURE 2 and comprises a supply chute 1 for solid polymer in chip or flake form, the said chute feeding into the input end of a screw conveyor 3, the screw 7 of which is rotated by an electric motor 5, through gearing 15 and rubber coupling 17, at a speed to convey the solid material to the melting section B at a rate slightly in excess of the rate at which molten material is extruded from the apparatus. The screw conveyor which here, also, is shown mounted vertically comprises a two-flight screw 7 revolving within a short cylindrical barrel 9 leading into that part 77 of the melting chamber 35 above the melting grid. This part of the chamber widens out to about double the width of the barrel, as will be described in greater detail hereinbelow. The shaft 13 of the screw conveyor 3 is resiliently mounted by means of rubber coupling 17 for limited movement in the axial direction, such that if the pressure in the melting chamber above the grid rises above a certain amount, say, 70 pounds per square inch, the shaft will withdraw in the direction away from the grid and cause electrical contacts 19 to be opened to stop the drive to the screw. The configuration of the part 21 of the chamber 23 immediately above the screw 7 is frusto-conical, the cone half-angle being of the order of 45°. The inside of the wall 29 of this part of the chamber is knurled. Mounted on the screw shaft 13 are two radially-extending spreaders 25, 27 spaced by 120° from each other having their outer ends shaped to correspond with that of the knurled conical surface 29 of the chamber, and extending to within a fraction of an inch thereof. The angle by which the spreaders are separated from one another can be adjusted. The outlet end 31 of the chute 1 supplying the polymer chip to the screw extends somewhat into the chamber 23 and delivers chip to the chamber at a point close above the plane of rotation of the spreaders 25, 27 and close to the knurled wall 29 of the chamber. The cross-sectional area of the outlet 31 is small compared with that of the chamber 21. A plurality of ports 33 are cut in the wall of the chamber at a level some inches above the chute outlet, to allow of ready venting of water vapor to atmosphere.

The particular means employed in feeding the solid polymer chips to the input of the screw conveyor are essential to prevent the formation of "bridges" of chipped polymer above the screw, which would otherwise be likely to occur owing partly to the occasional presence of ribbon-like chips amongst the more normal-shaped ones and partly to the water vapor given off by the chips of nylon polymer during melting, which condenses on the chips in and above the screw conveyor as the vapor rises, and causes the chips so affected to adhere somewhat to one another.

The cross-sectional area of the outlet of the chute should not, of course, be so small that there is any danger of the solid particulate matter becoming jammed across it, but it must be small enough to ensure that the downward rate of travel of the particulate matter at the outlet is greater than the upward rate of travel of any water vapor rising through the screw and the matter above it. This ensures that no water vapor can get into the chute and lead to "bridging" of the particulate matter therein.

The spreaders should extend nearly to the wall of the chamber above the screw and be mounted close above the first flight thereof. The outlet of the chute should be arranged to supply the particulate material close above the plane of rotation of the spreaders and near to the wall of the said chamber.

These means will ensure that only a thin layer of solid particulate matter ever lies above the screw, and this will not enhance the ease with which any long ribbon-like particles are accepted by the screw, but also will allow water vapor (or other vapor) an easy passage through it and thence to atmosphere through a suitable number of ports in the walls of the chamber above the outlet from the chute. The spreaders will assist in the acceptance by the screw of the particulate matter in a uniform manner, and the actual rate at which this matter is supplied to the screw can be varied (for any given cross-sectional area of outlet from the chute) by a choice of the size, shape, number or position of the spreaders mounted on the shaft above the first flight of the screw. In this manner, the optimum feed rate to the screw may be established which, whilst maintaining a sufficient delivery of particulate matter to the melting means from the screw, will sufficiently "starve" the screw flight so as to make it more certain that all shapes of the particulate matter will be accepted by the screw and not help to form a "bridge" above the screw.

In order to achieve the most positive control by the spreaders on the particulate matter in the particular case of the apparatus illustrated in FIGURE 2, it has been found to be beneficial, as previously referred to, to have the inner surface of the wall of the chamber above the screw, which wall may be in the shape of an inverted frusto-cone, roughened, as by knurling. At the same time, it is best to have the screw shaft highly polished, so that the maximum drag on the particulate matter occurs by its contact with the wall rather than with the shaft.

The melting section B (see FIGURE 1) comprises the melting chamber 35 and contains a heated melting grid 37, a baffle plate 39 with central drain 41, immediately below the grid, a pipe 43 leading down from the said drain into the lower part of the melting chamber, a gear pump 47 at the lower end of the said chamber driven by a shaft 49, having a flexible portion 53, which enters the chamber through a gland 51 in one side of the chamber approximately level with the grid 37, an inlet pipe 55 for steam having its outlet above the lower end 57 of the said drain pipe 43 and adapted to disperse steam through horizontally-directed orifices 59 to all parts of the melting chamber below the grid, an output channel 61 leading from the gear-pump 47 to the extrusion section C, and a level sensing device 63, for controlling the level of molten polymer in a pool in the lower portion 67 of the chamber. The melting grid may conveniently comprise seven hollow fins 69 of roughly triangular shape in section through which is circulated a heating fluid, which is also circulated through ducts 71, 73 in the walls of the chamber at the level of the grid. Owing to the pressure exerted on the polymer, forcing it down and through the grid, it is possible and desirable to have the lower parts of the fins much closer to one another than in a gravity melter. The baffle plate 39 extends right across the chamber below the grid and is separated by some ½ inch from the lower ends of the fins of the grid. The central drain 41 in the baffle plate is of suitable size to allow for a free continuous flow of molten polymer through it and down the pipe 43 leading into the lower end of the chamber. The level sensing device 63 carries an electrode or probe 79, inserted into the chamber and connected to a circuit having a source of electric current. An electric current can be conducted by molten polymer, and the probe is arranged so that it will be sufficiently immersed in molten polymer at a certain level of the pool of polymer (say, 3 inches in depth) just above the lower end of the drain pipe so that an electric current passes round the circuit via the probe, the polymer and the wall of the melting chamber. The passage of this current can be made to control the motor of the screw conveyor, as will be described in greater detail hereinafter. The steam which is injected into the chamber through orifices 59 below the grid is allowed to escape to atmosphere, with any other gases given off by the molten polymer, through the gland 51 of the shaft of the gear pump. The output of the gear pump is provided with a pressure relief orifice 75 allowing molten polymer to be returned to the pool in the event, as is usually the case, of an excess of polymer being forwarded to the extrusion section.

In order to ensure even melting of polymer across the whole width of the melting grid 37, and in order to have a sufficiency of solid material under pressure awaiting melting, it is arranged that there shall be a certain space 77 between the end of the screw 7 (and its barrel 9) and the top of the melting grid 37. This space is laterally bounded by the walls of the melting chamber 35. Due to the friction between e.g. nylon chip and the walls of the melting chamber, which are made, e.g. of mild steel, there would be a reaction in a direction opposite to the force applied by the screw if this space were cylindrical in shape, i.e. a mere continuity of the barrel of the screw. Consequently, the walls of the chamber diverge from the end of the screw barrel and at an angle such that the half-angle of the frusto-cone so formed is between 15° and 45°. As illustrated the half-angle is 30° which is the preferred value.

As stated previously in general terms, the rotation of the screw conveyor 3 is effected by an electric motor 5, in the supply of which there is a starter circuit having a no-volts relay. Switches in the relay coil circuit can be controlled by the pool level sensing means (i.e. probe 79). Moreover in the particular case of the apparatus described with reference to FIGURE 2 the switches are also controllable by the pressure-responsive means comprising the rubber coupling 17. If the pressure above the grid rises above a desired, and safe, amount the screw will be stopped either by the motor being tripped by an overload relay (FIGURE 1), or by the pressure-responsive means including the rubber coupling acting on the no-volts relay (FIGURE 2), and will not start again until, through lack of feeding, the pressure drops to the desired amount. If the level of the pool of molten polymer rises above that which is desired the screw will be stopped since the circuit including the probe will be rendered conductive and the screw will not start again until, after extrusion of the requisite excess amount of molten polymer, the level drops to the desired position. In the instance of the axially-displaceable shaft (FIGURE 2) the restoring force is provided by the rubber coupling between the screw shaft and a reduction gearing of the screw motor. In this coupling, which may conveniently be a coupling sold under the trademark "Metalstik," a cylinder of rubber 83, bonded to inner and outer metal cylindrical members 85, 87, transmits the drive from the inner member 85 to the outer member 87, which latter is connected to the screw conveyor shaft 13. This rubber coupling, which can be pre-loaded in assembly, will allow limited axial movement of the screw conveyor shaft dependent on the pressure in the solid particulate matter being fed by the screw. If the rubber coupling is pre-loaded, the axial movement of the shaft will not occur until a certain pressure is exceeded. Once the motor has been stopped the pressure beneath the screw will drop as the solid matter is melted. The stored energy in the rubber coupling will then force the screw downwards, and, when the pressure has been lowered by the required amount, the contacts will be made again, and the screw motor started. In the probe control arrangements, the probe 79 projects downwards into that part 67 of the melting chamber 35 below the grid 37 and terminates at the required height of the melt-pool surface. A second probe can be inserted terminating just above this height. The change of electrical resistance between a probe and ground when the end of the probe is immersed in the molten material, i.e. nylon polymer, is used to actuate a relay in an electrical circuit containing the probe, which in turn operates the no-volts relay of the screw motor supply. In the case of a second probe which does not extend so far downwards into the lower part of the chamber, it is arranged that it will actuate an alarm signal, as, of course, it will only ever come into action in the event of the lower, primary probe having failed. The necessary action can then be taken to replace or repair the defective primary probe 79.

For correct operation, it is essential that the probes shall always be well insulated from the wall of the melting chamber through which they extend.

It has been found beneficial to insert a time delay relay in the circuit controlled by the probe relay, in order that the screw motor shall not be stopped by reason of any short-lived contact of molten polymer with the active probe, such as would arise from the possibly bubbly surface of the pool, before the true level of the surface had reached the height of the probe.

A suitable time delay circuit comprises a resistance-capacitance network incorporated in an electronic relay. Thus, when the potential at a point in the network falls due to conduction of electrical current through the probe and polymer, it is arranged that the fall in potential of the grid of a triode shall follow after a suitable delay due to the resistance-capacitance network. When the grid potential has by this means dropped slowly to a certain value, the triode changes from a fully conducting to a non-conducting state, and the relay is operated. The reverse applies when the probe becomes non-conducting after the level of polymer has once more dropped below it. That is to say, that after a suitable delay the triode suddenly changes into the fully-conducting state and de-energises the relay.

The extrusion section C comprises two gear-pumps 93, 95 feeding molten polymer at a given constant rate to two spinneret assemblies of which one, 97, only is shown. These assemblies each comprise a filter pack of sand 99 and a spinneret plate 101 having the desired number of small orifices through which the molten polymer is extruded in the shape of filaments. The sand is contained within holder 103, and is supported on a sintered metal screen 105 itself supported on carrier plate 107 through which a number of orifices serve to distribute the molten polymer uniformly to all the orifices of the spinneret. The spinneret assemblies may be separately heated although means so to do are not shown, so as to enable the melt-spinning of the nylon polymer to be accomplished at a given melting temperature and at a given same or different spinning temperature.

In the operation of such melt-spinning apparatus, nylon polymer chip is supplied continuously down supply chute 1 to the input of the screw conveyor 3 which forwards it to the melting grid 37 which is internally heated to 290° C. by the circulation of a heated fluid through the hollow members thereof. After the apparatus has been in operation a short time, the whole part 77 of the melting chamber above the grid is filled with tightly-package polymer under pressure, the lower parts of which are forced down between the fins 69 of the grid where the polymer is melted. The molten polymer is positively removed from the fins by the pressure above it, and runs along the surface of the baffle plate 39 to the drain 41 in the center thereof, and thence down the pipe into the pool. Molten polymer is withdrawn from the pool by the gear pump 47 at the lower end of the pool (the so-called booster pump) and forwarded along ducts to the extrusion section in the manner already known in the art. The volume of the connecting ducts is kept as small as possible in order to minimise the chances of hydrolysis. The level sensing means maintain the level of the pool substantially constant, the quantity of polymer in the pool being such that polymer passes through it in approximately 7 minutes when extruded at the rate of 19 pounds per hour. The control of the level sensing means on the screw conveyor shaft motor is such that the motor is running for, say, 3 minutes and switched off for the next 3 minutes and so on.

The effect of the baffle plate, combined with the pressure feed and the thorough dispersion of steam below the grid, is to ensure that no gel is quickly formed on any of the surfaces of the melting chamber above the surface of the melt-pool, and to ensure that the molten polymer is directed straight into the pool.

By the use of the apparatus according to the invention, it is possible to melt-spin nylon yarns of a denier of 840 and a tenacity of over 9 grams per denier when drawn, at a rate of 19 pounds per hour; whereas prior to the invention it was impracticable to spin nylon yarns of this tenacity on a production basis at all. Furthermore, such apparatus is able to remain in operation, before having to be withdrawn for cleaning, something like ten times longer than any known gravity melting apparatus.

What we claim is:

1. Apparatus for melting and spinning a fiber- and film-forming synthetic linear polymer material comprising melting grid means for melting said polymer material, feed means comprising a screw flight for forcing said polymer material in solid particulate form under pressure to said melting means, chamber and conduit means for collecting molten polymer material directly from said melting means and for causing it to flow in a continuous stream downwardly into a pool of said molten polymer material, pool chamber means below said melting means for containing said pool, means for sensing the level of the surface of said pool and means operable in response to said sensing means for control of the feed means to automatically maintain the level substantially constant, means for introducing a gas for excluding free oxygen from that part of the pool chamber above the surface of the said pool and for keeping the pool at a constant pressure of about atmospheric pressure, and means for withdrawing molten polymer material from the said pool and for extruding it through a shaped orifice or orifices.

2. Apparatus according to claim 1 in which the means for forcing the solid particulate polymer to the said melting means comprises a screw conveyor.

3. A process for melt-spinning a fiber and film-forming synthetic linear polymer, which comprises forcing said polymer in solid particulate form under pressure to a heated melting means, melting said polymer therein, flowing the resulting molten polymer in a continuous stream downwardly into a separately maintained pool of said molten polymer, maintaining an atmosphere substantially free of oxygen and substantially at a constant pressure of about atmospheric pressure above the surface of said pool, controlling the rate at which said solid particulate polymer is forced to said melting means in accordance with the level of the surface of said pool to maintain said level substantially constant, withdrawing said molten polymer from the said pool and feeding the same to spinning means, and spinning the same into shaped structures.

4. A process for melt-spinning a fiber and film-forming synthetic linear polyamide, which comprises forcing said polyamide in solid particulate form under pressure to a heated melting means, melting said polyamide therein, flowing the resulting molten polyamide in a continuous stream downwardly into a separately maintained pool of said molten polyamide, maintaining an atmosphere substantially free of oxygen and substantially at a constant pressure of about atmospheric pressure above the surface of said pool, controlling the rate at which said solid particulate polyamide is forced to said melting means in accordance with the level of the surface of said pool to maintain said level substantially constant, withdrawing said molten polyamide from the said pool and feeding the same to spinning means, and spinning the same into shaped structures.

5. A process according to claim 4 in which the synthetic linear polyamide is a polyamide of a relative viscosity greater than 36.

6. A process according to claim 5 in which the pool of molten polyamide is maintained at substantially atmospheric pressure by injecting steam into the melting chamber above the surface of the said pool, and allowing said steam to escape to atmosphere.

7. A process according to claim 6 in which the level of the surface of the said pool is maintained substantially constant by intermittently over-feeding the solid polyamide material and jointly controlling the rate of feeding with the said level of the surface of the said pool.

8. A process according to claim 7 in which the said controlling of the rate of feeding as further defined as electrically controlling the rate of feeding by passing a current of electricity through said pool.

9. A process according to claim 7 including, during a period of over-feeding, holding the rate at which solid polyamide material is removed from a mass thereof at a substantially constant rate correlated with the rate at which said material is forced under pressure to the heated melting means.

10. A process according to claim 5 in which the pressure at which the solid polyamide material is forced is of the order of 50 pounds per square inch.

11. Apparatus according to claim 2 in which the said melting means comprises a grid heated internally by a fluid circulated therethrough.

12. Apparatus according to claim 11 in which the walls of that part of the melting chamber between the output end of the said screw conveyor and the top of the said grid diverge at an angle such that the half-angle of the frusto-cone so formed is between 15° and 45°.

13. Apparatus according to claim 11 in which the means for collecting molten polymer material directly from said melting means comprises baffle plate means extending across the said melting chamber and closely spaced below said grid, said plate having a central drain, conduit means connected to said central drain and extending downwardly into said pool of molten polymer material which is confined within the lower part of the said chamber.

14. Apparatus according to claim 11 in which the means for sensing the level of said pool comprise at least one probe extending into the lower part of the said chamber to an extent such that the lower end thereof is at the desired level of the said pool, the said probe being electrically insulated from the wall of the said chamber through which it extends and being incorporated in an electrical circuit associated with the motor driving the said screw conveyor.

15. Apparatus according to claim 14 in which the electrical circuit comprises a resistance-capacitance network incorporated in an electronic relay capable of actuating a second relay in the supply circuit of an electric motor for driving said screw conveyor.

16. Apparatus according to claim 2 and having means for supplying said solid particulate polymer material to said screw conveyor at a rate correlated with the rate of forwarding of the said polymer material by said screw conveyor.

17. Apparatus according to claim 16 in which said means for supplying said solid particulate polymer material comprise spreaders attached ot and extending radially from the shaft of said screw conveyor and adapted to spread the said material emanating from a chute filled therewith laterally above the input end of the said screw conveyor.

18. Apparatus according to claim 17 in which the outlet end of the said chute extends into a chamber above the input end of the said screw conveyor, the said outlet having a cross-section which is small in comparison with that of the said chamber, and in which the said outlet terminates at a height just above the plane of rotation of said spreaders, and a shelf formed within the said chamber and positioned beneath said outlet and juxtaposed below the plane of rotation of said spreaders.

19. Apparatus according to claim 2 and having means for intermittently stopping said screw conveyor and actuated when the pressure exerted thereby exceeds a certain predetermined amount.

20. Apparatus according to claim 19 in which said means for intermittently stopping said screw conveyor comprises an over-load relay in the supply circuit of an electric motor for driving said screw conveyor.

21. Apparatus according to claim 19 in which said means for intermittently stopping said screw conveyor comprises a pre-loaded rubber coupling in the driving shaft of said screw conveyor, and electrical contacts aadpted to be made or broken when the said screw conveyor is moved axially away from said melting means by a certain amount corresponding to said certain predetermined pressure, and an electrical circuit including said contacts and a relay in the supply circuit of an electric motor for driving said screw conveyor.

22. A process for melt-spinning a fiber and film-forming synthetic linear polyamide, which comprises forcing said polymer in solid particulate form under pressure to a heated melting means, melting said polyamide therein, flowing the resulting molten polyamide in a continuous stream downwardly into a separately maintained pool of said molten polyamide, maintaining an atmosphere of steam substantially free of free oxygen and substantially at a constant pressure of about atmospheric pressure above the surface of said pool, controlling the rate at which said solid particulate polyamide is forced to said melting means in accordance with the level of the surface of said pool to maintain its level substantially constant, withdrawing said molten polyamide from the said pool and feeding the same to spinning means, and spinning the same into shaped structures.

References Cited in the file of this patent

UNITED STATES PATENTS

| | | |
|---|---|---|
| 2,253,176 | Graves | Aug. 19, 1941 |
| 2,369,553 | Fields | Feb. 13, 1945 |
| 2,437,686 | Dreyfus | Mar. 16, 1948 |
| 2,571,975 | Waltz | Oct. 16, 1951 |
| 2,719,776 | Kummel | Oct. 4, 1955 |
| 2,791,802 | Weber | May 14, 1957 |
| 2,898,628 | Phipps | Aug. 11, 1959 |

FOREIGN PATENTS

| | | |
|---|---|---|
| 744,855 | Great Britain | Feb. 15, 1956 |
| 551,431 | Italy | Nov. 20, 1956 |